Nov. 1, 1927.
S. HOROWITZ
AUTOMOBILE BUMPER
Filed May 28, 1927
1,647,627
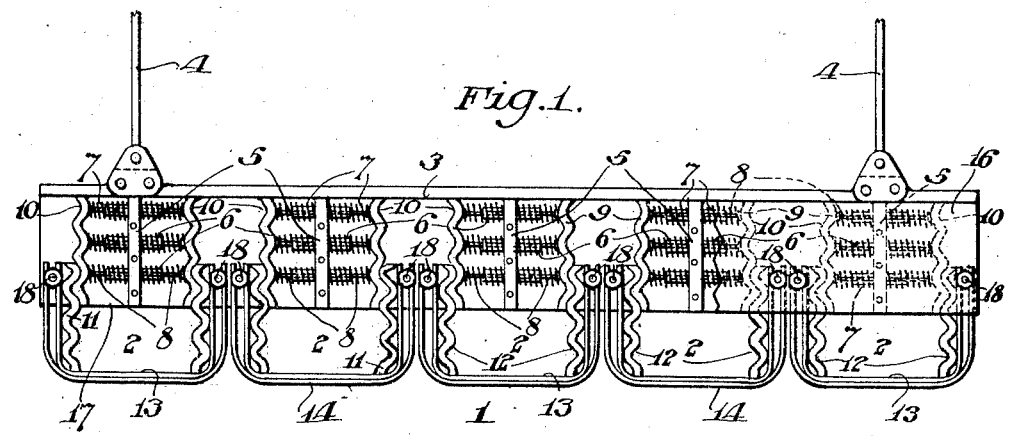
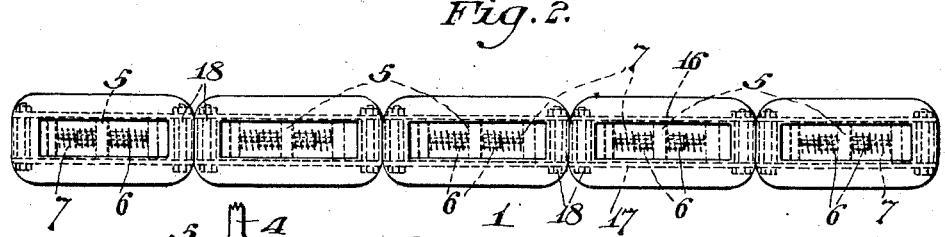
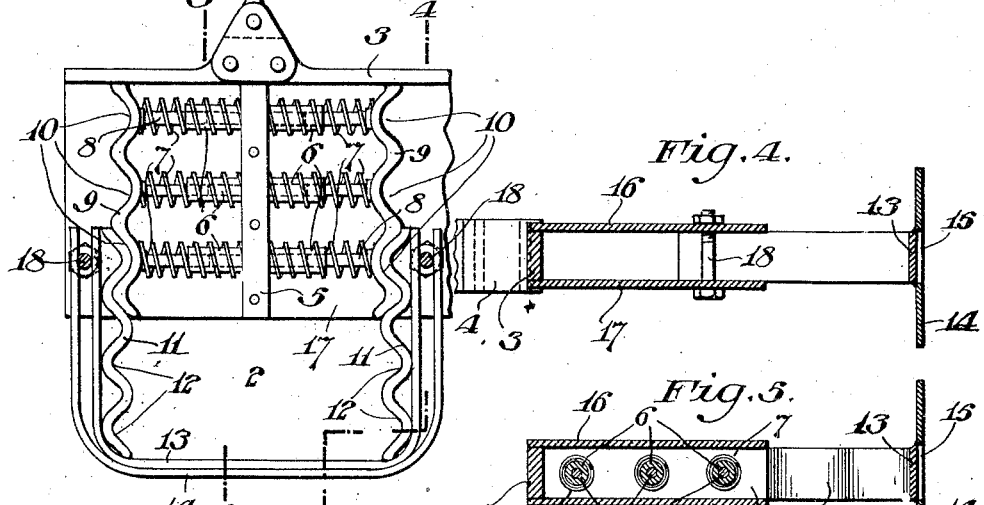
Inventor:
Samuel Horowitz
By Jas. C. Wobensmith
Attorney Patented Nov. 1, 1927.

1,647,627

UNITED STATES PATENT OFFICE.

SAMUEL HOROWITZ, OF PHILADELPHIA, PENNSYLVANIA.

AUTOMOBILE BUMPER.

Application filed May 28, 1927. Serial No. 194,897.

This invention relates to automobile bumpers used for the purpose of avoiding or at least minimizing damage or injury to a vehicle or its occupants in cases of accidental collision, and the invention contemplates the provision of a structure which will be durable, simple to manufacture and assemble, efficient in its action, and so constructed that injury to a portion thereof will not necessitate the replacement of an entirely new bumper.

The principal object of the invention is to provide a simple and efficient bumper which will effectively minimize the shock in the event of sudden impact with another object of the vehicle upon which it is mounted.

A further object of the invention is to provide a bumper for vehicles, which bumper is made of independently operable sections.

A further object is to provide a bumper for vehicles which will be positive in its action, and which combines the joint action of frictional and resilient means.

A further object is to provide a bumper for vehicles, portions of which may be removed and replaced without affecting the remaining parts.

A further object is the provision of a bumper for vehicles having a plurality of independent separately movable engagement members, each provided with shock absorbing members.

The nature and characteristic features of my invention will be more readily understood from the following description, taken in connection with the accompanying drawings forming part hereof, in which:

Figure 1 is a top view of the bumper, certain parts being broken away to show more clearly the relative arrangement of the movable sections;

Fig. 2 is a front view of the same;

Fig. 3 is an enlarged view of one of the sections of the bumper;

Fig. 4 is a sectional view taken on line 4—4 of Fig. 3; and

Fig. 5 is a sectional view taken on the line 5—5 of Fig. 3.

Referring to the drawings, in the particular embodiment of my invention therein shown, 1 denotes the assembled bumper made up of a plurality of independent sections 2, carried by a backing member or bar 3.

The backing member 3 has secured thereto at convenient points brackets 4 whereby the bumper may be attached to a vehicle. These brackets may be of any preferred type, and, as they do not form an essential part of the invention, they will not be described in greater detail.

There is also provided a series of bars 5, one for each of the sections. Each of the bars 5 has a plurality of tubular members 6 arranged on both sides of the bar 5, and on the outside of each of which a spring 7 is mounted. Rods 8 fit into the tubes 6 and are free to move therein.

The rods 8 are attached to strips 9, said strips 9 having a plurality of undulations 10 therein.

A bar 5, a set of tubes 6, the rods 8 coacting therewith, the springs 7 mounted thereon, and two strips 9, one on each side, constitute an assembly which forms the male member of one of the separate units making up the bumper.

Engaging the assembly above described is an assembly composed of a pair of strips 11, the said strips 11 also each having a series of undulations 12, complemental to the undulations of the strips 9. The strips 11 are attached to a U-shaped bar 13, which in turn is attached to a U-shaped member 14, the front portion of which is of greater width and is preferably provided with an opening 15 to reduce the weight.

The complete bumper preferably consists of a plurality of assemblies of coacting male and female members arranged side by side as shown, and covered by a top plate 16 and a bottom plate 17.

The top and bottom plates 16 and 17 are held together by means of bolts 18 passing therethrough, and these bolts also serve as guides for the U-shaped members 13 and 14, the side legs of said U-shaped members 13 and 14 being separated sufficiently for the bolts 18 to extend therebetween.

The operation of the bumper may now be explained. When the bumper impacts violently against any object, the front portion of the U-shaped member 14 coming in contact therewith, the female member will be pushed inward, whereupon the undulating strips 11 forming part thereof will cause the undulating strips 9 of the male member to be forced toward the bar 5, against the tension of the springs 7, thereby permitting the female member to be forced inward a distance sufficient for the undulations of the respective strips to re-engage at other places.

It will be understood that should the impact be of a certain force, the movement of the female member will be sufficient merely to permit the same to be moved a single step, but should the impact be greater, the movement will take place through a greater number of steps. In this manner the force of the impact will be taken up not only by the resistance of the springs 7, but also by reason of the frictional engagement of the undulating surfaces of the strips.

The above disclosure is to be understood as illustrating a specific form or embodiment of my invention and not as limiting the same, since many changes and substitutions may be made without departing from the spirit of my invention. For instance, the tubes 6 and rods 8 may be omitted, in which case the springs 7 may be attached directly to the bar 5 and the strips 9. The number as well as the curvature of the undulations 10 and 12 may also be varied. The strips 9 may be reinforced on the sides which do not engage, so that the entire assembly may be strengthened, and if desired, the opening 15 in the front portion of the member 14 may be omitted.

Having thus described the nature and characteristic features of my invention, what I claim as new and desire to secure by Letters Patent, is:

1. In a bumper for vehicles a corrugated member normally held in fixed position and a second corrugated member complemental to and engaging the first member, and movable with respect thereto when shock is imparted to the second member.

2. A bumper for vehicles comprising a plurality of corrugated members, resilient means interposed between said members, and a second group of members, said second group of corrugated members adapted to engage the first members.

3. A bumper for vehicles comprising a plurality of pairs of corrugated members, resilient means interposed between each of said pairs of members, and a second group of pairs of corrugated members, each of said pairs of the second group cooperative with a pair of said first members.

4. A bumper for vehicles comprising a backing member, a plurality of corrugated strips supported thereby, resilient means intermediate said strips, and a second group of corrugated members, each of said strips of said second group cooperative with a strip in the first group.

5. A bumper for vehicles comprising a backing member, a plurality of pairs of corrugated strips supported thereby, resilient means intermediate said strips, and a second group of pairs of corrugated strips, each of said pairs of the second group cooperative with a pair of strips in the first group.

6. A bumper for vehicles comprising a backing member, a plurality of pairs of corrugated strips supported thereby, springs intermediate said strips, and a second group of pairs of corrugated strips, each of said pairs of the second group cooperative with a pair of strips in the first group.

7. A bumper for vehicles comprising a backing member, a plurality of bars mounted in front of said backing member, a plurality of pairs of corrugated strips slidably mounted with respect to each of said bars, tubular members intermediate said bars and strips, rods slidably mounted in said tubular members, resilient means intermediate said bars and strips, said resilient means encompassing said rods and tubular members, and a second group of pairs of corrugated strips, each of said pairs of the second group cooperative with a pair of strips in the first group.

8. A bumper for vehicles comprising a backing member, a plurality of bars mounted in front of said backing member, a plurality of pairs of corrugated strips slidably mounted with respect to each of said bars, tubular members intermediate said bars and strips, rods slidably mounted in said tubular members, springs intermediate said bars and strips, said springs encompassing said rods and tubular members, a second group of pairs of corrugated strips, each of said pairs of the second group cooperative with a pair of strips in the first group, and means connecting the pairs of strips in the second group.

9. A bumper for vehicles comprising a backing member, a plurality of bars mounted in front of said backing member, a plurality of pairs of corrugated strips slidably mounted with respect to each of said bars, tubular members carried by said bars, rods carried by said strips, resilient means intermediate said bars and strips, said resilient means encompassing said rods and tubular members, and a second group of pairs of corrugated strips, each of said pairs of the second group cooperative with a pair of strips in the first group.

10. A bumper for vehicles comprising the combination with means for supporting the same, of a plurality of independently operable units, each of said units comprising corrugated members, resilient means bearing against said members, other corrugated members complemental to the first mentioned members, and a frame in which said second mentioned members are mounted.

11. A bumper for vehicles comprising the combination with means for supporting the same, of a plurality of independently operable units, each of said units comprising a pair of corrugated members, resilient means bearing against said members, a second pair of corrugated members complemental to the first pair, and a frame in which said second pair of members is mounted.

12. A bumper for vehicles comprising the combination with means for supporting the same, of a plurality of independently operable units, each of said units comprising a pair of corrugated members, springs bearing against said members, a second pair of corrugated members complemental to the first pair, and a frame in which said second pair of members is mounted.

13. A bumper for vehicles comprising the combination with means for supporting the same, of a plurality of independently operable units, each of said units comprising a pair of corrugated members, a bar fixedly positioned between said members, springs interposed between said bar and said members, a second pair of corrugated members complemental to the first pair, and a frame in which said second pair of members is mounted.

14. A bumper for vehicles comprising the combination with means for supporting the same, of a plurality of independently operable units, each of said units comprising a pair of corrugated members, a bar fixedly positioned between said members, springs interposed between said bar and said members, a second pair of corrugated members complemental to the first pair, and a U-shaped frame in which said second pair of members is mounted.

In testimony whereof, I have hereunto signed my name.

SAMUEL HOROWITZ.